Oct. 25, 1955 H. L. JOHNSON 2,721,726

DRILL HEAD

Filed Aug. 10, 1949

INVENTOR.

Howard L. Johnson

United States Patent Office 2,721,726

Patented Oct. 25, 1955

2,721,726

DRILL HEAD

Howard L. Johnson, Los Angeles, Calif.

Application August 10, 1949, Serial No. 109,575

12 Claims. (Cl. 255—300)

This invention relates to rotary rock bits of the type used to drill oil wells and the like.

It is an object of the invention to provide bits having rotatable members characterized by projecting spike-like cutting teeth over their entire surface, entirely separated from or physically unattached to the drill chuck, and which function by pressurized rotation thereagainst of the lower socketed face of the chuck, with which sockets some of the cutting teeth always articulate. Such chucks are provided with longitudinal channels for circulation of drilling fluid to the bottom of the bore as well as having electromagnets associated therewith which are operable from the surface, for retention of the metallic cutters thereagainst when moving the cutting head up or down in a bore.

The cutters are generally spherical in form, and can thus be readily cast and quickly "mounted" on the chuck so that the requirement of bearing connections is entirely eliminated. This permits the instantaneous and effortless replacement of worn rollers by new ones as well as resulting in more-or-less uniform wear of the whole surface of the sphere. Of course the socketed friction plate wears out in time, but generally more slowly than the cutters, and in any event, the plate by itself may also be replaced in the chuck as required.

In addition to the ease of fabrication and replacement of my drill bit, it should be noted that articulation of the cutting teeth with the chuck sockets automatically prevents "balling up" of mud or clay on these teeth and thus eliminates frequent occurrence of "balling up," as when conventional rock bits run into soft or gummy strata.

My invention is here embodied in two constructions: one which has a limited socket area (Figures 1–2) is particularly adapted for use in softer strata and is capable of a more than annular movement due to possible travel of its axis of rotation. The other form (Figures 3–4) is provided with a completely socketed pressure plate for use in applying considerably more weight thru the drill stem to the bit in grinding highly resistant rock. During engagement by the chuck, with this construction the axis of rotation of the spherical bit does not change, but such change may be effected from time to time by vertical reciprocation of the chuck, with or without intermittent use of the electromagnet to raise and drop the ball, in order to turn the upper teeth to the lower grinding surface. A particular advantage of this construction for hard rock drilling is that if the bit movement is temporarily halted, further rotation of the drill stem will not cause it to break as with conventional bits, but instead the socketed pressure plate of the chuck will move up along the teeth of the upper face of the bit and will ride over them. This will seldom occur, but the point is that its possibility furnishes a welcome alternative to breaking the drill stem because nothing is capable of slipping.

In the drawings, which form part of the present specification:

Figure 1:
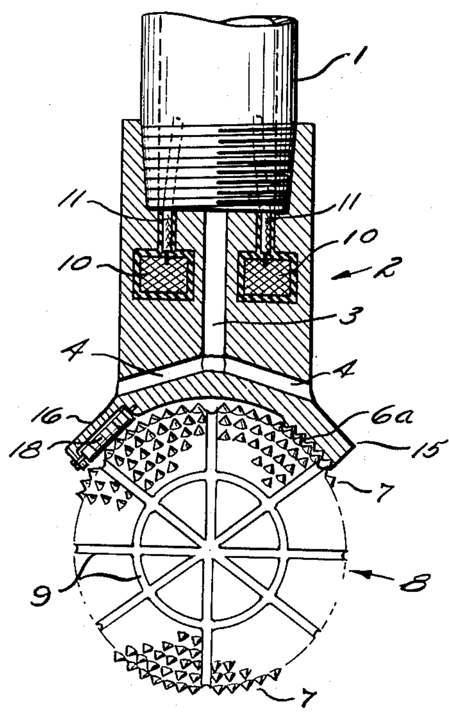
Figure 1 is a side elevational view of the soft strata form of my drill head, with the chuck shown in vertical section.
Figure 3:
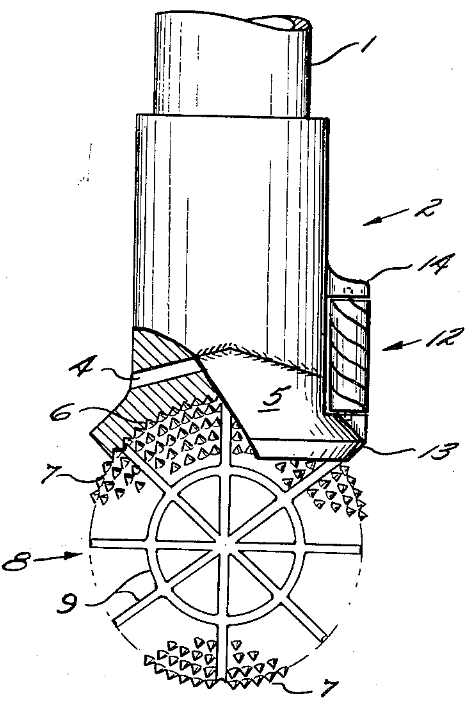
Figure 3 is a side elevational view of the hard rock form of my drill head, with a portion broken away.
Figure 4:
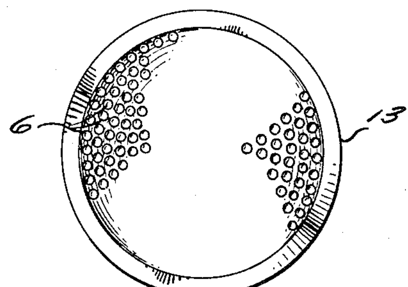
Figure 4 is a bottom plan view of the chuck of Figure 3 with the cutting sphere removed.

As illustrated in Figures 1 and 3 there is provided for threaded or other attachment to a drill stem 1 or analogous actuating device, a chuck 2, generally annular in cross section and having a more-or-less central channel 3 therein for drilling fluid to pass thru from the hollow drill stem to the bottom of the bore, by the lateral outlets 4. To the bottom of the chuck there is secured, as by bolts, welding or the like, a dished or concave pressure plate 5. As seen in Figure 4, the lower face of this plate is provided with sockets 6, spaced to correspond to the spacing of the teeth or spikes 7 on a spherical cutting member 8. The surface of the ball 8 is entirely covered with the projecting cutting teeth or spikes 7, uniformly spaced apart, so that upon down-pressure of the chuck, the spikes are engaged by the sockets 6 and upon rotation of the chuck while pressing against the ball, the latter will turn simultaneously therewith with its lower teeth cutting deeper into the correspondingly curved bottom of the bore.

The cutting sphere may also be provided with a grid or network of peripheral, surface grooves 9 to allow movement of fluid and cuttings to and from the base of the bore. A particular advantage of such separated cutting or grinding members is that they can be readily and cheaply cast of any desired alloy, with the teeth coated with tungsten carbide or other extremely hard material if desired. Also they can be replaced without disassembling the chuck; and they do not have a point of structural weakness associated with bearing mountings as in conventional bits. Likewise the cost and inconvenience of forming and lubricating such bearing mountings is eliminated. For purposes of keeping the ball attached to the chuck while raising and lowering same in the bore, there is an electromagnet 10, built in the chuck and actuated by electric cables 11 from the surface.

Altho the electromagnet built into the chuck is a preferred construction, the cutter ball will of course operate without it, particularly when starting the bore from the surface. Or when resuming drilling in a partly drilled hole from which the tools had been previously withdrawn, the spherical cutter 8 could merely be dropped down the hole and the chuck lowered on top of it, the pressure plate and cutting teeth being practically self-aligning. After the chuck is withdrawn, the ball could then be removed by a separate "fishing" tool or magnet.

If desired, one or more reamers or side cutters 12 may also be carried by the chuck to maintain the diameter of the hole, the reamer being supported between the outturned lip 13 and a projecting side boss 14 of the chuck.

Figure 2:
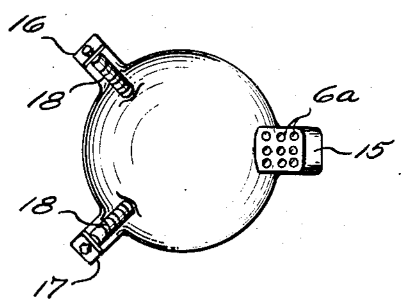
Figure 2 is a bottom plan view of the chuck of Figure 1 with the cutting ball removed.

In the construction of Figures 1–2, the lip portion of the chuck is formed as three fingers, only one of which (15) is provided with spike-engaging sockets *6a*, while the other two fingers 16, 17 each carry a longitudinal series of rollers 18. Jointly the several fingers (which could be more or less in number) center the ball 18 between them but since only one (15) exerts a torque thereon, the sphere may not only turn with the rotating chuck but also move in relation thereto. In this manner, particularly with intermittent vertical movement of the chuck, the upper teeth of the ball gradually work down to cutting position in the bore. While the pressure plate 5 is shown as joining the chuck along the fluid lateral lines 4 so as to allow them to be formed in the top thereof, this also of course could be varied.

While I have shown and described in some detail presently preferred embodiments of my drill heads, it is to be understood that various modifications may be made in the construction and operation thereof within the spirit and scope of the subsequently claimed invention which it is my intention to claim broadly within the limitations imposed by the prior art.

I claim:

1. A drill head, comprising in combination: a drill chuck adapted to be attached at the top to a rotatable drill stem, said chuck being longitudinally apertured for passage of drilling fluid therethru, the bottom of said chuck being concave and formed with downwardly opening sockets therein; a separate, generally spherical, rotatable member having projecting cutting teeth about the surface thereof, which teeth are spaced apart so as to articulate with the sockets of said chuck whereby said member is forced to revolve by rotation of the socketed end of the chuck pressed thereagainst, said chuck and rotatable member being physically connected solely by frictional engagement of the sockets and teeth, and the diameter of the rotatable member being at least equal to that of the chuck, some of which teeth are received in said sockets.

2. The drill head of claim 1 wherein said rotatable member is formed with grooves over its surface to allow circulation of fluid to the bottom of the bore.

3. The drill head of claim 1 wherein said chuck carries an electromagnet operable from the surface for holding the rotatable member thereagainst during movement up and down the bore.

4. The drill head of claim 1 wherein said chuck is formed with a separable pressure plate on its lower face which carries said sockets.

5. A generally spherical one-piece drill bit having its surface substantially covered with projecting spike-like cutting teeth, equally spaced apart, which surface is formed with intersecting, peripheral grooves to allow circulation of fluid there around during drilling.

6. A generally spherical one-piece drill bit having projecting spike-like cutting teeth about the surface thereof, equally spaced apart, the surface of said sphere being substantially unbroken and devoid of means for attachment to a drill chuck other than said projecting teeth.

7. A drill chuck having means at its upper end for operative connection to a rotatable drill stem, the lower end of said chuck being concavely arcuate and formed with downwardly opening sockets therein, equally spaced apart and forming thereby the sole physical means of selective attachment to a correspondingly spiked, spherical drill bit.

8. A drill head comprising in combination: a drill chuck having means at its upper end for operative connection to a rotatable drill stem, the lower end of said chuck being concavely arcuate and formed with downwardly opening sockets therein adapted for frictional driving connection with projecting teeth of a correspondingly arced ball, said chuck having no other means of physical connection to such cutting ball; and a cutting ball having projecting cutting teeth about the surface thereof, equally spaced apart and some of which are received in said sockets in driving connection, the diameter of said ball being at least equal to that of the chuck.

9. The drill head of claim 8 which is provided with an electromagnet adapted selectively to hold the ball against the chuck.

10. A drill chuck having means at its upper end for operative connection to a rotatable drill stem, the lower end of said chuck being concavely arcuate and formed with a bottom terminal lip which is successively recessed to form a circumferential series of centering fingers, at least one of which fingers is formed with downwardly opening sockets in its concave face adapted for frictional driving connection with projecting teeth of a correspondingly arced ball, said chuck having no other means of physical connection to such cutting ball.

11. A drill chuck having means at its upper end for operative connection to a rotatable drill stem, the lower end of said chuck being concavely arcuate and formed with a bottom terminal lip which is successively recessed to form a circumferential series of centering fingers, one of which fingers is formed with downwardly opening sockets in its concave face adapted for frictional driving connection with projecting teeth of a correspondingly arced ball and another of which fingers carries rollers held against said ball, said chuck having no other means of physical connection to such cutting ball.

12. A drill head comprising in combination: a drill chuck having means at its upper end for operative connection to a rotatable drill stem, the lower end of said chuck being formed with downwardly opening sockets therein adapted for frictional driving connection with corresponding projections of a drill bit; and a one-piece drill bit having projecting cutting teeth about a lower, hemispherical cutting face thereof, the circumference of said bit being at lease equal to that of the chuck, said bit being formed with upper projections received in said sockets whereby the bit is rotated by and in unison with the rotating chuck.

References Cited in the file of this patent

UNITED STATES PATENTS

| | | |
|---|---|---|
| 474,297 | Hoffmann | May 3, 1892 |
| 1,762,504 | Bull | June 10, 1930 |
| 2,092,316 | Lane | Sept. 7, 1937 |
| 2,095,725 | Whealy | Oct. 12, 1937 |